United States Patent [19]

Tsukuda et al.

[11] Patent Number: 5,715,313
[45] Date of Patent: Feb. 3, 1998

[54] MAGNETIC RECORDING/REPRODUCING METHOD

[75] Inventors: Fumiaki Tsukuda; Tsutomu Sugisaki; Yasushi Endo, all of Odawara, Japan

[73] Assignee: Fuji Photo Film Co., Ltd., Kanagawa, Japan

[21] Appl. No.: 535,511

[22] Filed: Sep. 28, 1995

[30] Foreign Application Priority Data

Sep. 30, 1994 [JP] Japan ................... 6-261342

[51] Int. Cl.$^6$ .................................. H04L 9/00
[52] U.S. Cl. ................... 380/22; 380/4; 360/18
[58] Field of Search ............ 380/4, 22; 360/18, 360/19.1, 20, 21, 60; 235/490

[56] References Cited

U.S. PATENT DOCUMENTS

| | | | |
|---|---|---|---|
| 4,785,361 | 11/1988 | Brotby | 380/4 |
| 5,027,396 | 6/1991 | Platteter et al. | 380/4 |
| 5,058,162 | 10/1991 | Santon et al. | 380/4 |
| 5,206,494 | 4/1993 | Metzger | 235/490 |
| 5,293,422 | 3/1994 | Loiacono | 380/4 |
| 5,295,187 | 3/1994 | Miyoshi | 380/4 |
| 5,365,586 | 11/1994 | Indeek et al. | 380/4 |
| 5,408,505 | 4/1995 | Indeck et al. | 380/4 |
| 5,572,589 | 11/1996 | Waters et al. | 380/4 |

Primary Examiner—Salvatore Cangialosi

[57] ABSTRACT

Information is recorded on a floppy disk in a state in which the confidentiality of the information is maintained. An ID signal representing ID information is magnetically recorded down to the lower layer of a floppy disk when data is recorded. A data signal representing information (a data file) to be recorded is also magnetically recorded down to the lower layer of the floppy disk. A security signal is magnetically recorded on the upper layer of the floppy disk over at least the data signal that has been recorded on the lower layer of the floppy disk. At the time of data reproduction, the ID signal is reproduced from the floppy disk and the ID information represented by the reproduced ID signal is compared with entered ID information. When the two items of compared ID information agree, the security signal that has been recorded on the upper layer of the floppy disk is erased. The data signal that has been recorded on the lower layer of the floppy disk is then reproduced.

24 Claims, 8 Drawing Sheets

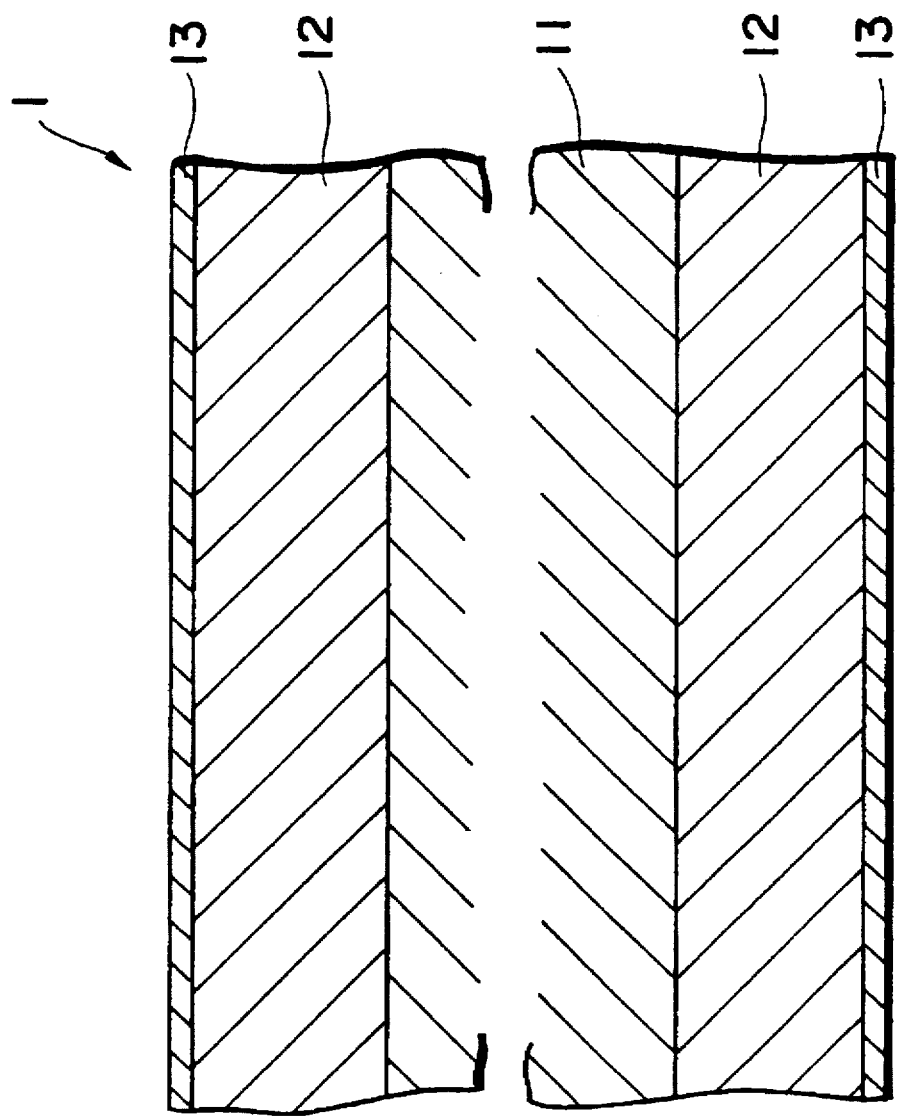

*Fig. 2a* DATA RECORDING SIGNAL 
*Fig. 2b* SECURITY RECORDING SIGNAL (RANDOM SIGNAL) 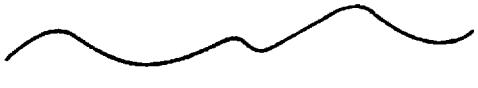
*Fig. 2c* REPRODUCED SIGNAL 
*Fig. 2d* SECURITY ERASING SIGNAL (DC SIGNAL) 
*Fig. 2e* REPRODUCED SIGNAL 

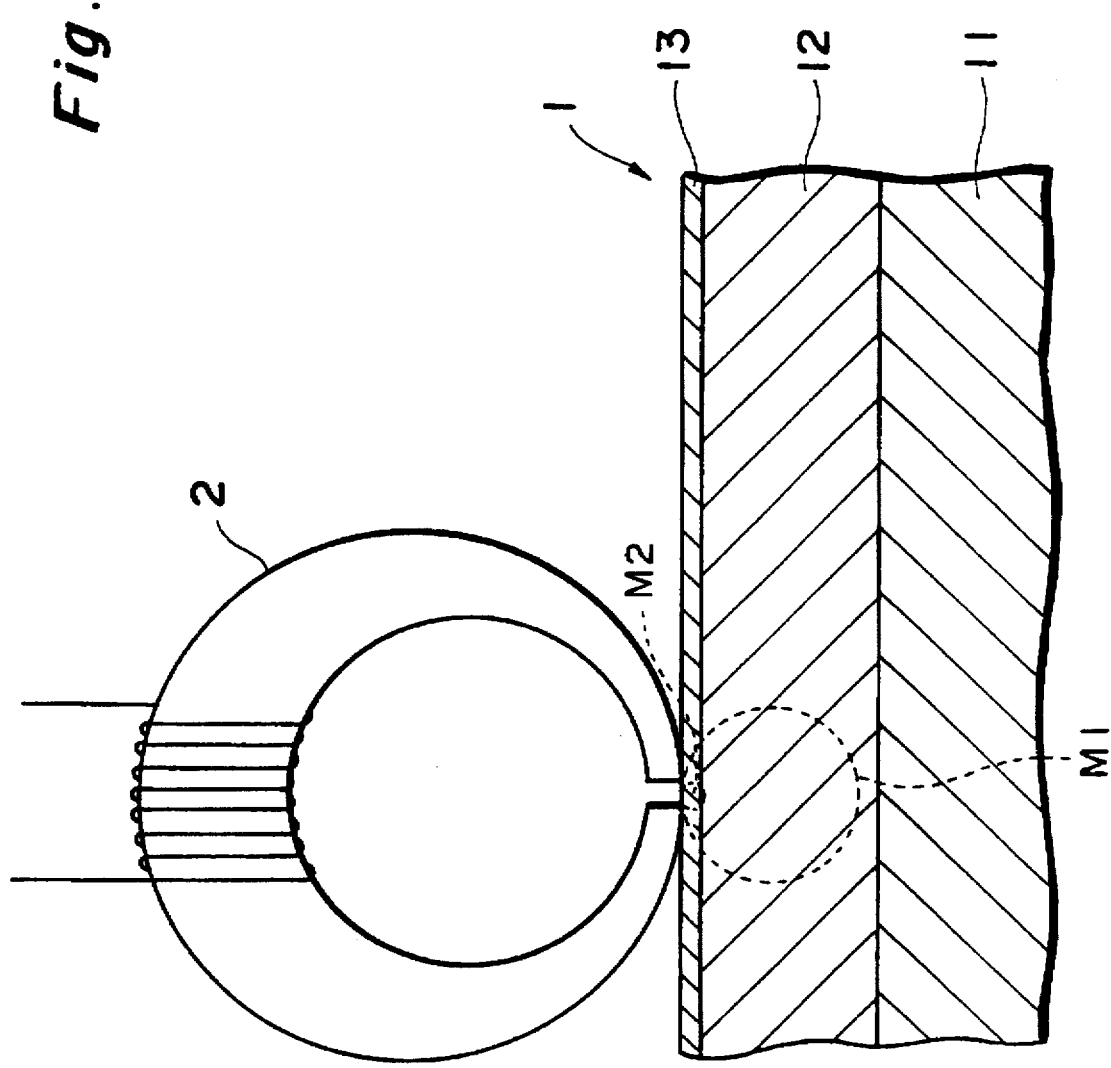

ID

MAGNETIC RECORDING/REPRODUCING METHOD

BACKGROUND OF THE INVENTION

1. Field of the Invention

This invention relates to a magnetic recording/reproducing method through which information is recording on and reproduced from a magnetic recording medium in a state in which the confidentiality of the information is maintained. The term "recording/reproducing" is meant to cover magnetic recording only, magnetic reproducing only and both magnetic recording and reproducing.

2. Description of the Related Art

The recording of a data signal representing information (a data file) on a magnetic recording medium is carried out by magnetizing a magnetic substance (material or body) on the magnetic recording medium by the magnetic head of a magnetic recording apparatus. The reading of the information is performed by reproducing the residual magnetism of the magnetized magnetic substance of the magnetic recording medium by the magnetic head of a magnetic playback apparatus. Accordingly, if the residual magnetism representing the data signal (information) recorded on the magnetic recording medium can be reproduced by the magnetic head, then anyone can read the information from the magnetic recording medium at any time.

It is required that the secrecy of some information recorded on a magnetic recording medium be maintained. When such information is recorded, the conventional practice is to write the information upon applying a protector to it by means of software (the operating system or application software) using a registration number, a secret code or the like. Since it is possible for the protector that has been applied to the information by software to be removed, it can be difficult to maintain the confidentiality of information recorded on a magnetic recording medium.

SUMMARY OF THE INVENTION

Accordingly, an object of the present invention is to provide a magnetic recording/reproducing method through which information can be recorded on and reproduced from a magnetic recording medium while the confidentiality of the information is maintained. The term "magnetic recording medium" is intended to cover both a disk-shaped magnetic recording medium and a tape-shaped magnetic recording medium.

According to the present invention, the foregoing object is attained by providing a magnetic recording/reproducing method using a magnetic recording medium having two recording layers, namely an upper layer formed of a magnetic substance (material or body) having a low magnetic coercive force and a lower layer formed of a magnetic substance having a high magnetic coercive force, the method comprising the following steps when data is recorded on the magnetic recording medium: magnetically recording an ID signal, which represents ID information, on the magnetic recording medium down to the lower layer; magnetically recording a data signal, which represents information to be recorded, on the magnetic recording medium down to the lower layer; and magnetically recording a security signal, on the upper layer of the magnetic recording medium, over at least the data signal that has been recorded on the lower layer of the magnetic recording medium; and the following steps when data is reproduced from the magnetic recording medium: reproducing the ID signal from the magnetic recording medium; comparing the ID information represented by the reproduced ID signal and entered ID information; erasing the security signal, which has been recorded on the upper layer of the magnetic recording medium, when the two items of ID information agree; and subsequently reproducing the data signal that has been recorded on the lower layer of the magnetic recording medium.

When the data is recorded, the data signal representing the information to be recorded and an ID signal representing the ID information entered by the individual recording the information are magnetically recorded on the lower layer, and the securing signal is magnetically recorded on these signals.

The ID information is for identifying the individual recording the information and specific individuals who are capable of utilizing (or are authorized to utilize) this information. The ID information may be a person's name, an registration number, an identification number, a secret code, etc. The ID information may also be a combination of some of these.

The magnetic recording of the ID signal and data signal is performed by a recording current large enough to allow recording sufficiently down to the lower layer (the layer of the magnetic substance having the high coercive force) of the magnetic recording medium.

The recording of the security signal is performed by a small recording current capable of implementing magnetic recording only the upper layer of the magnetic recording medium. Since the upper layer is the layer of the magnetic substance having the low coercive force, the security signal can be magnetically recorded using a recording current whose value is small in comparison with that for the data signal. Further, since the lower layer is the layer of the magnetic substance having the high coercive force, the data signal that has been recorded on the lower layer will not be rewritten by the security signal owing to the relatively small value of the recording current of the security signal.

When data is reproduced, the individual reading out the information recorded on the magnetic recording medium enters the ID information. The entered ID information is compared with ID information represented by the ID signal reproduced from the magnetic recording medium. When these two items of ID information agree, the security signal that has been recorded over the data signal is erased. The erasure of the security signal is performed by a direct current, the magnitude of which is the same as that used at the time of recording, with regard to the upper layer of the magnetic recording medium on which the security signal has been recorded.

When the security signal is erased, the data signal that has been recorded under the security signal is reproduced and the information represented by this data signal can be read out.

When the two items of ID information do not agree and the data signal is reproduced without the erasure of the security signal, a reproduced signal in which the data signal and security signal are superposed on each other is the result. The information represented by data signal recorded on the lower layer cannot be restored from this reproduced signal. Accordingly, as long as the ID information recorded on the magnetic recording medium fails to agree with the entered ID information, the information represented by the data signal recorded on the magnetic recording medium cannot be read out.

As a result, individuals other than those who know the ID information recorded on the magnetic recording medium cannot read out the information recorded on this magnetic recording medium and, hence, the confidentiality of the information is maintained with assurance. In other words, unauthorized use of important information by private individuals or enterprises can be prevented. This is useful in copyright protection.

In a preferred embodiment of the present invention, the method further includes steps of magnetically recording the security signal, on the upper layer of the magnetic recording medium, over the ID signal when data is recorded, and first erasing the security signal on the ID signal and then reproducing the ID signal when data is reproduced.

In a further preferred embodiment of the present invention, the method includes the step of recording the security signal on the data signal again after the data signal is reproduced. As a result, the information represented by the recorded data signal can be rendered confidential again.

In the present invention, the ID information need not always be used. In such case, use is made of a magnetic recording medium having recording layers in which an upper layer is formed of a magnetic substance having a low coercive force and a lower layer is formed of a magnetic substance having a high coercive force, the method comprising the following steps when data is recorded on the magnetic recording medium: magnetically recording a data signal, which represents information to be recorded, on the magnetic recording medium down to the lower layer; and magnetically recording a security signal, on the upper layer of the magnetic recording medium, over the data signal that has been recorded on the lower layer of the magnetic recording medium; and the following steps when data is reproduced from the magnetic recording medium: erasing the security signal that has been recorded on the upper layer of the magnetic recording medium; and subsequently reproducing the data signal that has been recorded on the lower layer of the magnetic recording medium.

Since the security signal must first be erased, a magnetic recording apparatus capable of erasing the security signal must be used.

The present invention further provides a magnetic recording method. The magnetic recording method of the present invention, in which use is made of a magnetic recording medium having recording layers in which an upper layer is formed of a magnetic substance having a low coercive force and a lower layer is formed of a magnetic substance having a high coercive force, comprises the steps of magnetically recording a data signal, which represents information to be recorded, on the magnetic recording medium down to the lower layer, and magnetically recording a security signal, on the upper layer of the magnetic recording medium, over the data signal that has been recorded on the lower layer of the magnetic recording medium.

The present invention further provides a magnetic reproducing method. The magnetic reproducing method of the present invention is a method of reproducing a data signal from a magnetic recording medium having recording layers in which an upper layer is formed of a magnetic substance having a low coercive force and a lower layer is formed of a magnetic substance having a high coercive force, the data signal, which represents information to be recorded, having been recorded on the magnetic recording medium down to the lower layer, and a security signal having been recorded on the upper layer over the data signal recorded on the lower layer, the method comprising the steps of erasing the security signal that has been recorded on the upper layer of the magnetic recording medium, and subsequently reproducing the data signal that has been recorded on the lower layer of the magnetic recording medium.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a sectional view of a floppy disk;

FIGS. 2a through 2e illustrate signals recorded on and reproduced from the floppy disk, in which FIG. 2a shows a data recording signal, FIG. 2b a security recording signal, FIG. 2c a reproduced data signal in which a data signal and a security signal are superimposed on each other, FIG. 2d a security erasing signal and FIG. 2e a data signal reproduced after the security signal is erased;

FIG. 3 illustrates a floppy disk and a recording head as well as a magnetic field for recording a data signal and a magnetic field for recording/erasing a security signal;

DESCRIPTION OF THE PREFERRED EMBODIMENT

Figure 4:
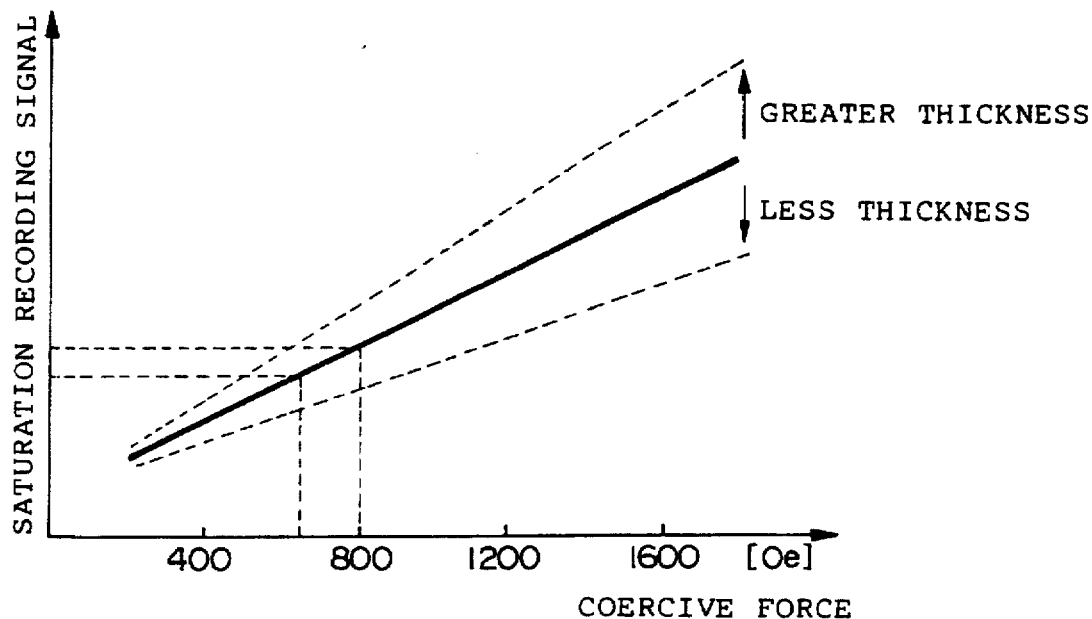
FIG. 4 is a graph illustrating the relationship between the coercive force of a magnetic substance and a saturation recording current.

An embodiment of the present invention will now be described in detail with reference to the accompanying drawings.

FIG. 1 is a sectional view illustrating a floppy disk (a magnetic recording medium) 1 in which the magnetic recording layers each have a two-layer structure.

The floppy disk 1 is capable of magnetically recording information (a data file) on both its sides (side 0 and side 1). The magnetic recording layer on each side of the floppy disk 1 has a two-layer structure. The magnetic recording layer is formed to have a layer (hereinafter referred to as a "lower layer") 12 of a magnetic substance (material or body) having a high magnetic coercive force using a PET (polyethylene terephthalate) base film 11 as a support base, and a layer (hereinafter referred to as an "upper layer") 13 of a magnetic substance having a low coercive magnetic force. The upper layer 13 is formed on the lower layer 12.

The lower layer (of the magnetic substance having the high coercive force) 12 is a magnetic substance whose coercive force is on the order of 700–3500 Oe, preferably 1000–3000 Oe, with 1400–2400 Oe being especially preferred. In one embodiment, the magnetic substance is a metal magnetic material whose coercive force is 1500 Oe. Further, the thickness of the lower layer 12 is on the order of 0.1–4.0 µm, preferably 0.2–3.5 µm, with 0.3–3.0 µm being especially preferred. In one embodiment, the thickness of the lower layer 12 is 1.0 µm.

The upper layer (of the magnetic substance having the low coercive force) 13 is a magnetic substance whose coercive force is on the order of 100–1500 Oe, preferably 200–1300 Oe, with 250–1200 Oe being especially preferred. In one embodiment, the magnetic substance is $Fe_2O_3$ having a coercive force of 500 Oe. Further, the thickness of the upper layer 13 is on the order of 0.01–2.0 µm, preferably 0.02–1.5 µm, with 0.03–1.0 µm being especially preferred. In one embodiment, the thickness of the upper layer 13 is 0.1 µm.

The coercive force, type and layer thickness of the magnetic substance forming each layer differ depending upon such factors as the disk diameter and storage capacity of the floppy disk.

FIG. 2 illustrates an example of signals magnetically recorded on or reproduced from the floppy disk 1, and FIG. 3 illustrates the floppy disk 1 and a magnetic head 2 for magnetically recording information and reproducing the information from the floppy disk 1.

FIG. 2a shows a data signal representing information (a data file) to be recorded in a data recording area (described later) of the floppy disk 1. The data signal is a signal in which information to be recorded has been modulated, as by frequency modulation. The data signal is amplified and then applied to the magnetic head 2. As shown in FIG. 3, the data signal is magnetically recorded on the upper layer 13 and lower layer 12 by a recording current (the details of which will be described later) which produces a recording magnetic field M1 capable of performing magnetic recording on both layers 12 and 13.

After the data signal has been magnetically recorded on the lower layer 12 and upper layer 13, a security signal is recorded on the upper layer 13. FIG. 2b illustrates an example of the security signal. The security signal is, say, a random signal, which may be a sinusoidal or rectangular periodic signal, by way of example. As shown in FIG. 3, the security signal is magnetically recorded only over the thickness of the upper layer 13 by a recording current which produces a recording magnetic field M2. As a result, the data signal is recorded on the lower layer 12 and the security signal is recorded on the upper layer 13.

When playback is performed with the data signal and security signal having been recorded on the lower layer 12 and upper layer 13, respectively, both the data signal and security signal are reproduced in a form superimposed on each other. FIG. 2c illustrates the reproduced signal. The latter is a signal in which the data signal shown in FIG. 2a and the security signal shown in FIG. 2b are superimposed on each other.

Since the recorded data signal is a modulated signal, the reproduced signal must be demodulated. The reproduced signal cannot be demodulated, however, because it is a signal composed of the overlapping security signal and data signal as set forth above. In other words, the information recorded on the floppy disk 1 cannot be read out. Accordingly, by magnetically recording the security signal on the data signal, the confidentiality of the information recorded on the floppy disk can be maintained.

In a case where the data signal has been recorded on the lower layer 12 of the floppy disk 1 and the security signal has been recorded on the upper layer 13, the information represented by the data signal can be read out in the following manner:

When information is initially written on the floppy disk, ID information for reading/writing information with regard to the floppy disk is recorded beforehand in an ID recording area, described later. The ID information may be the name of the user, a registration number, an identification number or a secret code, etc. The ID signal representing the ID information is magnetically recorded down to the lower layer 12 of the floppy disk in the same manner as the data signal. The security signal may be recorded on the ID information.

When information is read out of the floppy disk, the individual reading out the information enters the ID information into a computer system. The ID information that has been recorded on the floppy disk is read out. These two items of ID information are compared by the computer system and the security signal that has been recorded on the data signal is erased when the two items of ID information agree. The erasure of the security signal is performed by a direct current, which is shown in FIG. 2d, solely with regard to the upper layer 13 in the same way that the security signal is recorded. (The field M2 shown in FIG. 3 is used to erase the security signal.)

When the data signal is reproduced after the security signal has been erased, the reproduced signal shown in FIG. 2e is obtained. The reproduced signal is substantially the same as the data signal shown in FIG. 2a. Since the existence of the upper layer 13 on which the security signal has been recorded results in space loss, the reproduced signal takes on a small signal amplitude in comparison with a case in which the upper layer does not exist.

When the security signal has been erased, anyone can read out the data signal. Accordingly, the security signal is magnetically recorded on the data signal again after the data signal is reproduced.

Thus, whether information that has been recorded on the floppy disk can be read out or not (whether the security signal may be erased or not) is capable of being checked by the ID information recorded on the floppy disk. Accordingly, an individual who does not know the ID information, namely an individual other than the one who are authorized to read out the information, is incapable of reading information out of the floppy disk.

The signal recording current will now be described.

FIG. 4 is a graph showing the relationship between the coercive force of a layer of a magnetic substance and recording current. The relationship is shown with regard to thickness. Saturation recording current (described later) is proportional to the coercive force of a magnetic substance, and decreases when the thickness of the magnetic layer decreases and increases when the thickness of the magnetic layer increases.

Figure 5:
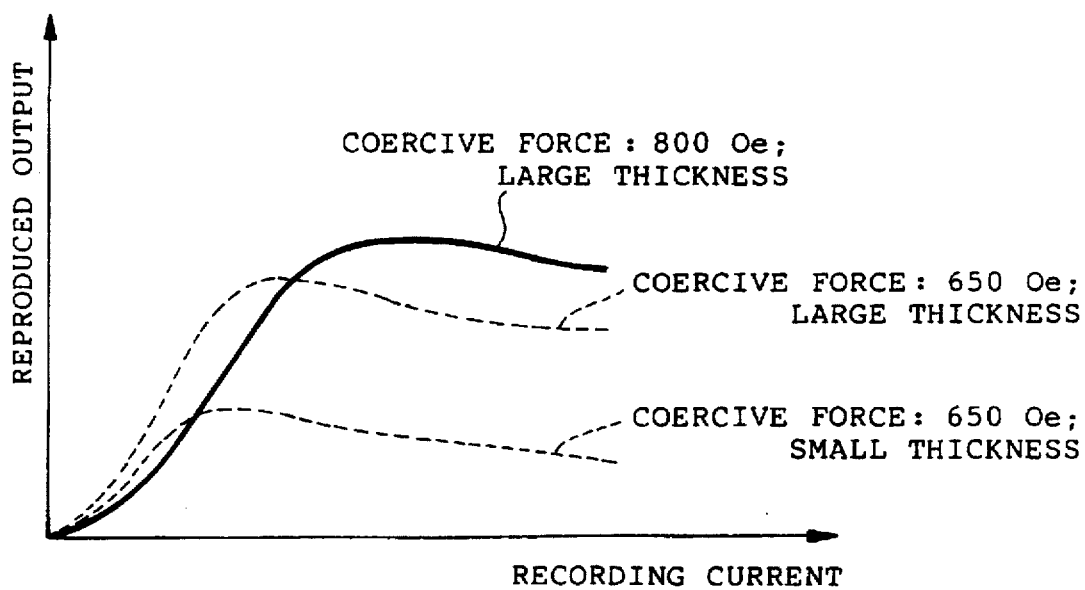
FIG. 5 illustrates the relationship between recording current and reproduced output.

FIG. 5 is a graph showing the relationship between recording current, which is for performing recording on a magnetic layer, and reproduced output. FIG. 5 illustrates the above-mentioned relationship with regard to a magnetic layer for which the coercive force is 800 Oe and magnetic layers for which the coercive force is 650 Oe, one of the latter having a thickness the same as that of the magnetic layer whose coercive force is 800 Oe, and the other having a smaller thickness.

The reproduced output increases with an increase in recording current. When the reproduced output takes on the maximum value (the recording current at such time is referred to as "saturation recording current"), the reproduced output subsequently decreases in gradual fashion with an increase in recording current.

In case of magnetic layers of the same thickness but different coercive force, the saturation recording current of the magnetic layer having the low coercive force of 650 Oe is smaller than the saturation recording current of the magnetic layer having the high coercive force of 800 Oe (as evident from FIG. 4). The maximum reproduced output of the magnetic layer having the low coercive force of 650 Oe is small in comparison with the maximum reproduced output of the magnetic layer having the high coercive force of 800 Oe. However, a comparatively large reproduced output can be obtained with a comparatively small saturation recording current in a case of the magnetic layer of the low coercive force of 650 Oe.

Further, in a case where the magnetic substances have the same coercive force (650 Oe) but the thicknesses of the layers thereof differ, the larger the thickness of the magnetic substance, the greater the saturation recording current and the larger the reproduced output.

Since a reproduced output large enough to enable demodulation of the data signal to information is required at the time of reproduction, the data signal is recorded by a recording current large enough for the lower layer 12, namely the layer of the magnetic substance having the high coercive force.

In consideration of the fact that the lower layer 12 is a magnetic layer having a high coercive force and that space is lost on the upper layer 13 on which the security signal has been recorded, the recording current for the data signal should reside in a range of values which is 1.0 to 2.0 times the value of the saturation recording current, which is taken as a reference ("1"), prevailing when a 1 F signal (a standardized low-frequency signal) is recorded on the magnetic substance of high coercive force forming the lower layer 12. The preferred range is a range of values which is 1.0 to 1.5 times the value of the saturation recording current, with a range of 1.2~1.5 being particularly preferred.

The recording current for the ID signal is the same as that for the data signal.

On the other hand, the security signal must be recorded and erased by a recording current small enough so as not to erase the data signal recorded on the lower layer 12. For this reason the upper layer 13 which records the security signal is formed by the magnetic layer having the low coercive force. In this layer a comparatively large reproduced output is obtained with a small recording current.

Further, the security signal does not require that a sufficiently large reproduced output be obtained, as in the case of the data signal. It will suffice to obtain a reproduced output of such size that the security signal is superimposed on the data signal at the time of reproduction so that the reproduced signal cannot be demodulated. Accordingly, the magnetic layer (upper layer 13) having the low coercive force can be made small in thickness. Reducing the thickness of the magnetic layer having the low coercive force makes it possible to reduce the space loss at the time of data-signal reproduction.

Furthermore, since the upper layer 13 of low coercive force is a thin layer, the current for recording/erasing the security signal can be made even smaller. The fact that the current for recording/erasing the security signal can be made small is convenient also in that the data signal recorded on the lower layer 12 will not be erased.

The recording current for the security signal should reside in a range of values which is 1/20 to 1/2 times the value of the recording current, which is taken as a reference ("1"), that applies the maximum reproduced output of the signal recorded on the lower layer 12. The preferred range is a range of values which is 1/10 to 1/3 times the value of the recording current, with a range of 1/10~1/5 being particularly preferred.

Figure 6:
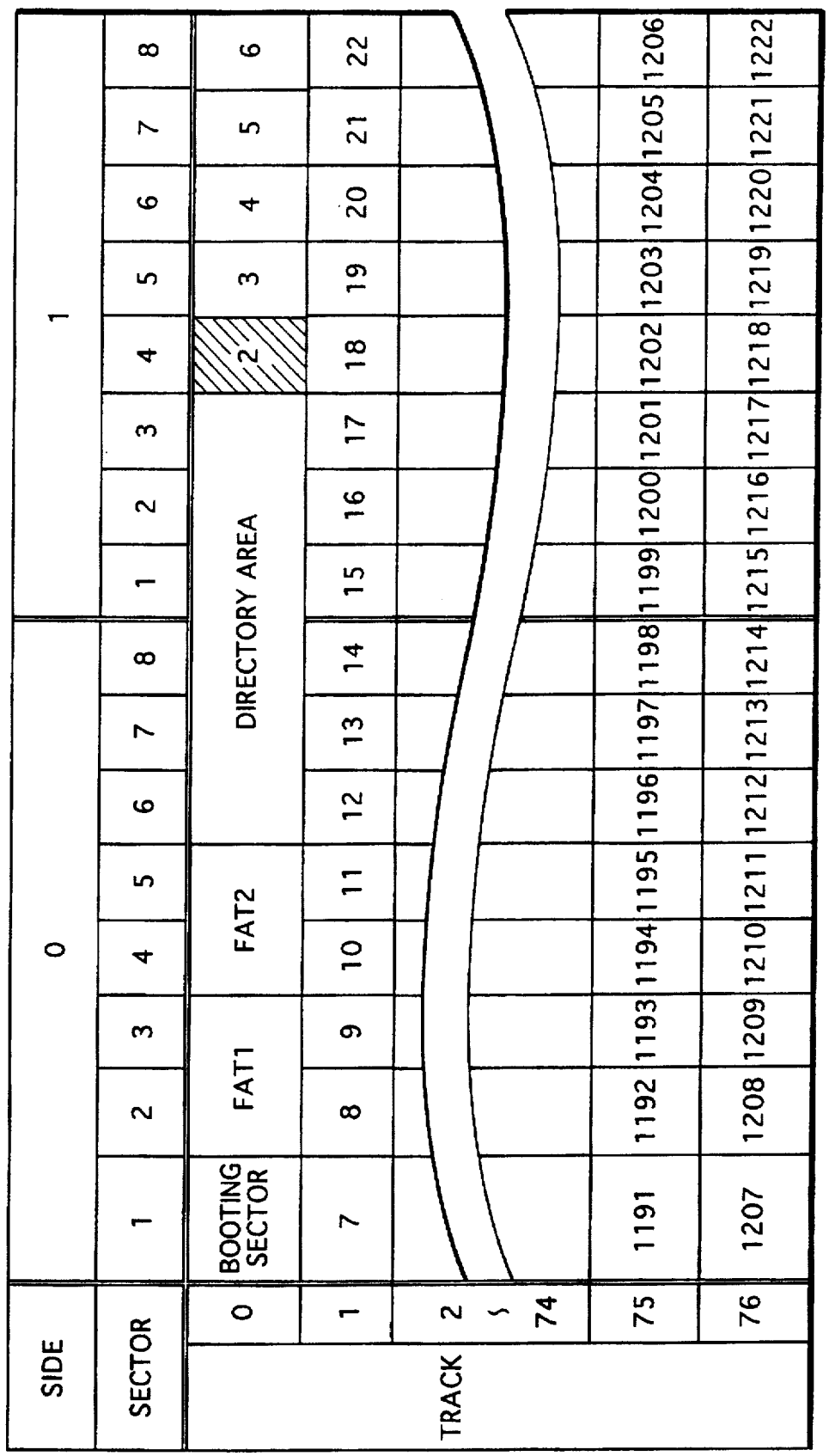
FIG. 6 shows an example of the data structure on a floppy disk.

FIG. 6 is an example of file management configuration of a floppy disk. The data file (information) recorded on the floppy disk is managed by the operating system (hereinafter referred to simply as the "OS"). The file management configuration differs depending upon the OS.

The floppy disk is recordable on both sides (sides 0, 1). Each side comprises 77 tracks from track 0 to track 76, and each track comprises eight sectors from sector 1 to sector 8.

The sectors from sector 1, track 0, side 0 to sector 3, track 0, side 1 constitute a file-information recording area, and the sectors from sector 4, track 0, side 1 constitute a data recording area.

The file-information recording area comprises a boot sector, a FAT 1, a FAT 2 and a directory area.

The boot sector is an area for a booting program. No file information is actually recorded here.

FAT 1 and FAT 2 are FATs (file allocation tables). Each FAT is a table representing the information (states of connection, detects) of the clusters constructing a file. (A cluster is the minimum unit by which the OS acquires an area, releases the area, uses or does not use an area). Since a FAT is of particular importance, identical contents are recorded in both FAT 1 and FAT 2.

Information regarding the name, attribute, creation date and starting cluster position of each recorded data file (item of information) is stored in a directory area.

Clusters are allocated to the data recording area in order starting from sector 4, side 1, track 1, with sector 4 serving as cluster 2.

The ID recording area can be set to any area (cluster) by the OS. The reason for this is that the reading/writing of a data file from/to the floppy disk is managed by the OS. In a case where one item of ID information is appended to one floppy disk, the ID recording area is allocated to cluster 2 (indicated by the hatching in FIG. 6), by way of example.

In a case where ID information is allocated to each and every data file, the ID recording area is allocated to the starting cluster of the clusters recording the particular data file, by way of example. Since the starting cluster position has been recorded in the above-mentioned FAT, the ID recording area can be specified with ease. By virtue of the fact that the ID recording area can be specified, the recording/erasure of the security signal can be carried out with regard to the ID recording area even through the ID recording areas are scattered with the data files.

Figure 7:
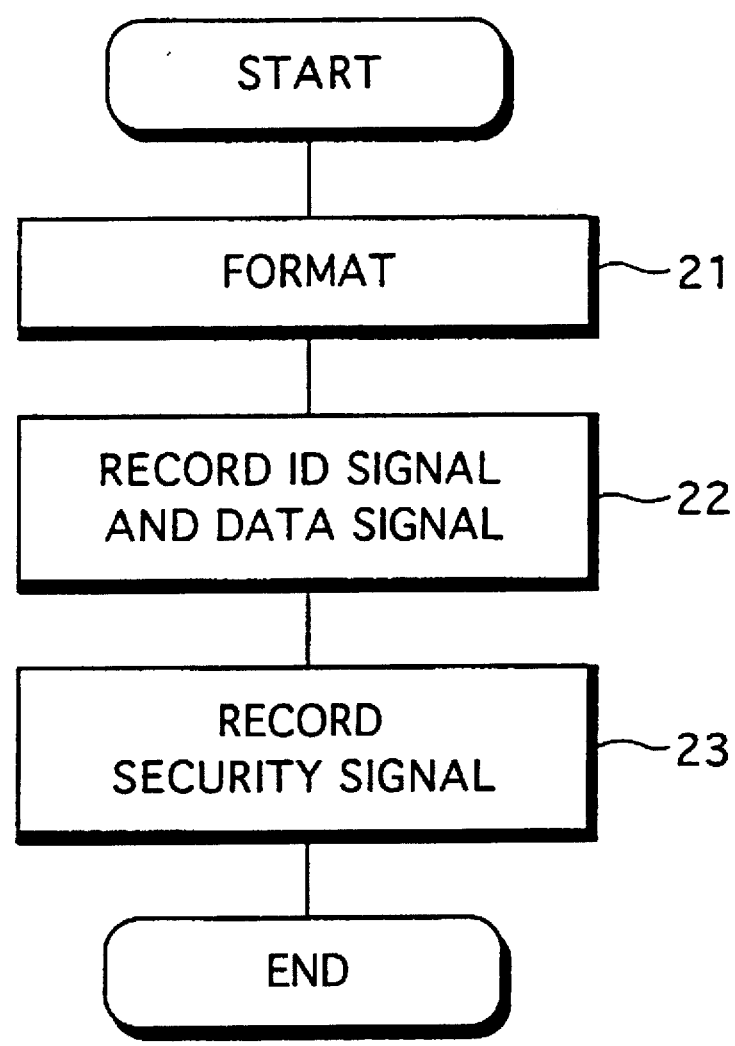
FIG. 7 is a flowchart showing a procedure for recording a data file on a floppy disk.

FIG. 7 illustrates a processing procedure through which a data file is initially recorded on a floppy disk. This processing is executed by a computer which writes the data to the floppy disk (or reads data from the floppy disk).

When a command for recording a data file is entered into the computer by the user, the floppy disk is formatted (step 21) (At this time the file-information recording area and the ID recording area are decided). The ID number representing the ID information set by the user is recorded in the ID recording area and the data signal representing the data file to be recorded is recorded in the data recording area (step 22). The security signal is recorded in the file-information recording area, the ID recording area and the data recording area in which the data file has been stored (step 23). The security signal need not be recorded in the file-information recording area. However, if the security signal is recorded in the file-information recording area, the content of the floppy disk becomes completely incomprehensible. This makes recording the security signal preferable.

Figure 8:
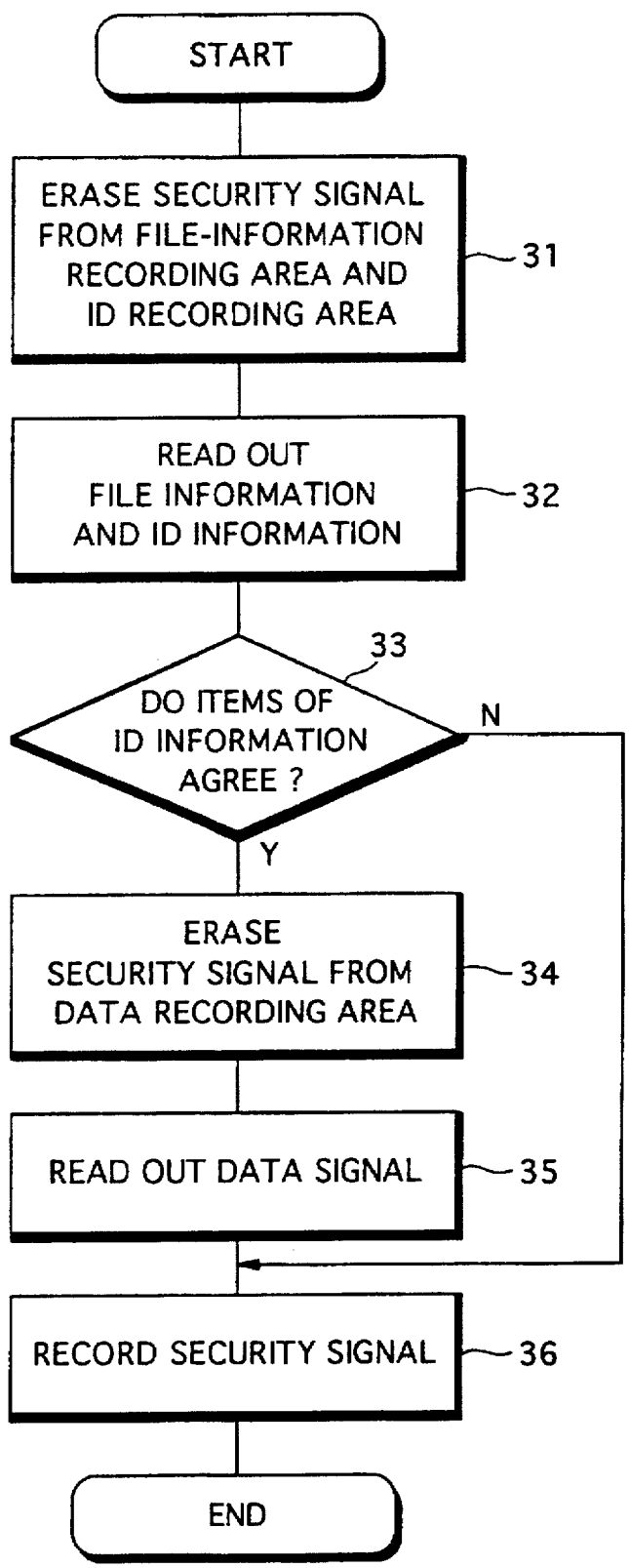
FIG. 8 is a flowchart showing a procedure for reading a data file out of a floppy disk; and, FIG. 9 is a flowchart showing a procedure for adding to a data file on a floppy disk by recording.

FIG. 8 illustrates a processing procedure for reading a data file out of the floppy disk. This processing also is executed by the computer.

When the command for reading out the data file is entered by the user, the security signal that has been recorded in the file-information recording area and ID recording area is erased (step 31). This is followed by readout of the file information and ID information (step 32). With reference to FIG. 6, the file-information recording area and ID recording area on the floppy disk are decided by the OS. Since these areas are acquired when the floppy disk is formatted, the computer is capable of specifying the positions of these areas on the floppy disk.

The item of ID information set (entered into the computer) by the user and the item of ID information read out of the floppy disk are compared (step 33). If these two items of ID information agree (YES at step 33), the security signal that has been recorded in the data recording area is erased (step 34) and the data signal is read out (step 35). When the data signal is read out, the security signal is re-recorded in the areas from which the security signal was erased, namely in the file-information recording area, ID recording area and data recording area (step 36).

If the two items of ID information fail to agree at step 33, the data signal is not read out and the security signal is re-recorded in the areas from which the security signal was erased, namely in the file-information recording area and ID recording area. In this case, an output may be produced to inform the user of the fact that the data file cannot be read.

Figure 9:
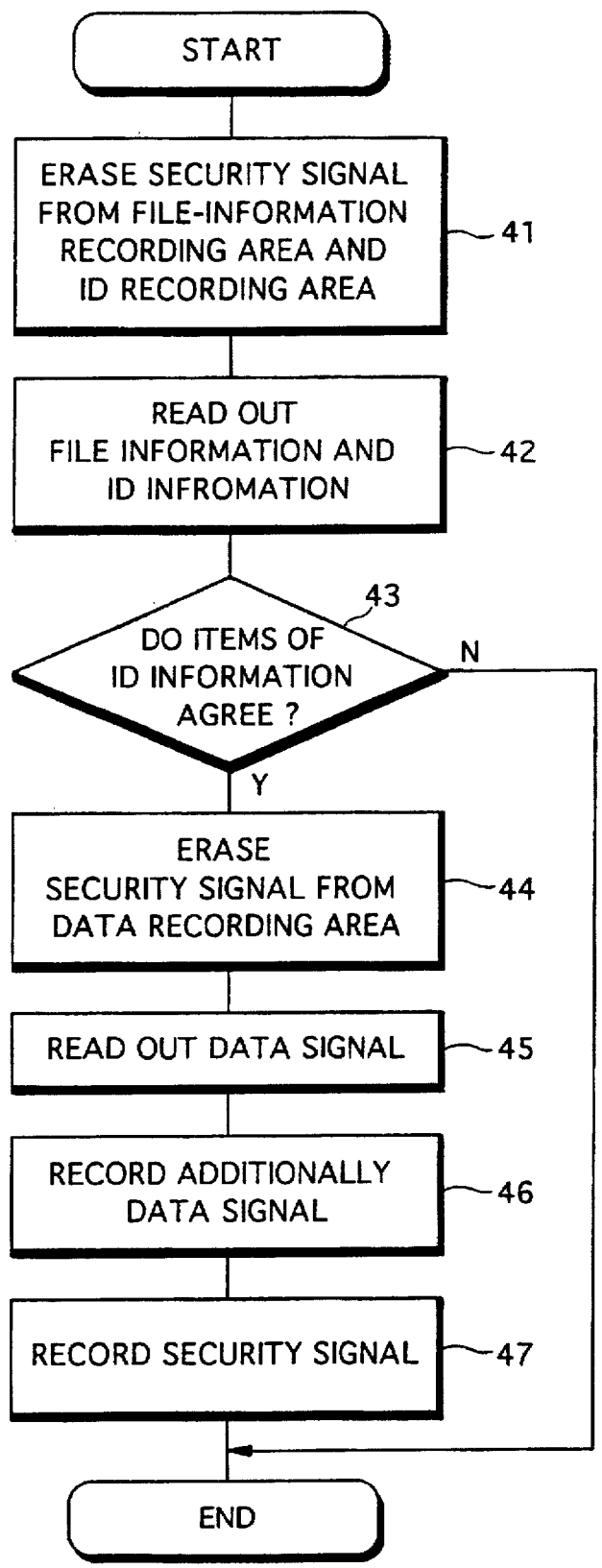

FIG. 9 illustrates a processing procedure through which an additional recording is made to a data file on the floppy disk.

When a recording command for adding to a data file is entered by the user, the security signal that has been recorded in the file-information recording area and ID recording area is erased (step 41) and the items of file information and ID information are read out (step 42).

The ID information set by the user and the ID information read out are compared (step 43). If the two items of information coincide (YES at step 43), then the security signal that has been recorded in the data recording area is erased (step 44). The data signal is then read out (step 45). The data file represented by the data signal read out is subjected to some kind of processing (or is re-edited) and a new data file is created by the computer. The data signal representing this new data file is recorded on the floppy disk (step 46). When the addition data signal is recorded, the file information is rewritten, after which the security signal is re-recorded in the file-information recording area, the ID recording area and the data recording area in which the data has been additionally recorded (step 47).

If it is found at step 43 that the items of ID information do not coincide, the data signal is not recorded as an addition and the security signal is re-recorded in the areas from which the security signal was erased, namely the file-information recording area and ID recording area. In this case, the OS may produce an output to inform the user of the fact that additional information cannot be written to data file.

By thus superposing and recording the security signal on the data signal representing a data file, the confidentiality of the data file is maintained.

Such protection of confidential information is not limited to floppy disks but is applicable also to magnetic tapes. The magnetic tapes may be 8-mm video tapes, DATs (digital audio tapes), etc. The recording format of the magnetic tapes may be of the helical-track type using a rotating head, the fixed-track type using a stationary head or a combination thereof.

As many apparently widely different embodiments of the present invention can be made without departing from the spirit and scope thereof, it is to be understood that the invention is not limited to the specific embodiments thereof except as defined in the appended claims.

What is claimed is:

1. A magnetic recording/reproducing method using a magnetic recording medium having a support base and recording layers which include a first layer formed of a magnetic substance having a first coercive force and a second layer formed of a magnetic substance having a second coercive force, the first layer being provided on the support base, the second layer being formed on the first layer, and the first coercive force being higher than the second coercive force, said method comprising the following steps when data is recorded on the magnetic recording medium:

magnetically recording an ID signal, which represents ID information, on the magnetic recording medium down to the first layer thereof;

magnetically recording a data signal, which represents information to be recorded, on the magnetic recording medium down to the first layer thereof; and magnetically recording a security signal, on the second layer of the magnetic recording medium, over at least the data signal that has been recorded on the first layer of the magnetic recording medium;

and the following steps when data is reproduced from the magnetic recording medium:

reproducing the ID signal from the magnetic recording medium;

comparing the ID information represented by the reproduced ID signal and entered ID information;

erasing the security signal, which has been recorded on the second layer of the magnetic recording medium, when the two items of the ID information agree; and subsequently reproducing the data signal that has been recorded on the first layer of the magnetic recording medium.

2. The method according to claim 1, further comprising the steps of:

magnetically recording the security signal, on the second layer of the magnetic recording medium, over the ID signal that has been recorded on the first layer, when data is recorded; and first erasing the security signal on the ID signal and then reproducing the ID signal, when data is reproduced.

3. The method according to claim 1, further comprising the step of recording the security signal over the data signal again after the data signal is reproduced.

4. The method according to claim 1, wherein the step of magnetically recording a security signal includes recording a random signal.

5. The method according to claim 1, wherein the first layer is directly provided on the support base.

6. The method according to claim 1, wherein the second layer is directly formed on the first layer.

7. The method of claim 1, wherein the step of magnetically recording the security signal includes applying a current having $\frac{1}{20}$ to $\frac{1}{2}$ a value of the current applied during the step of magnetically recording the data signal.

8. A magnetic recording/reproducing method using a magnetic recording medium having a support base and recording layers which include a first layer formed of a magnetic substance having a first coercive force and a second layer formed of a magnetic substance having a second coercive force, the first layer being provided on the support base, the second layer being formed on the first layer, and the first coercive force being higher than the second coercive force, said method comprising the following steps when data is recorded on the magnetic recording medium:

magnetically recording a data signal, which represents information to be recorded, on the magnetic recording medium down to the first layer thereof; and magnetically recording a security signal, on the second layer of the magnetic recording medium, over the data signal that has been recorded on the first layer of the magnetic recording medium;

and the following steps when data is reproduced from the magnetic recording medium:

erasing the security signal that has been recorded on the second layer of the magnetic recording medium; and subsequently reproducing the data signal that has been recorded on the first layer of the magnetic recording medium.

9. The method according to claim 8, wherein the step of magnetically recording a security signal includes recording a random signal.

10. The method according to claim 8, wherein the first layer is directly provided on the support base.

11. The method according to claim 8, wherein the second layer is directly formed on the first layer.

12. The method of claim 8, wherein the step of magnetically recording the security signal includes applying a current having $1/20$ to $1/2$ a value of the current applied during the step of magnetically recording the data signal.

13. A magnetic recording method using a magnetic recording medium having a support base and recording layers which include a first layer formed of a magnetic substance having a first coercive force and a second layer formed of a magnetic substance having a second coercive force, the first layer being provided on the support base, the second layer being formed on the first layer, and the first coercive force being higher than the second coercive force, said method comprising the steps of:

magnetically recording a data signal, which represents information to be recorded, on the magnetic recording medium down to the first layer thereof; and magnetically recording a security signal, on the second layer of the magnetic recording medium, over the data signal that has been recorded on the first layer of the magnetic recording medium.

14. The method according to claim 13, wherein the step of magnetically recording a security signal includes recording a random signal.

15. The method according to claim 13, wherein the first layer is directly provided on the support base.

16. The method according to claim 13, wherein the second layer is directly formed on the first layer.

17. The method of claim 13, wherein the step of magnetically recording the security signal includes applying a current having $1/20$ to $1/2$ a value of the current applied during the step of magnetically recording the data signal.

18. A magnetic reproducing method for reproducing a data signal from a magnetic recording medium having a support base and recording layers in which a first layer is formed of a magnetic substance having a first coercive force and a second layer is formed of a magnetic substance having a coercive force, the first layer being provided on the support base, the second layer being formed on the first layer, and the first coercive force being higher than the second coercive force, which represents information to be recorded, having been recorded on the magnetic recording medium down to the first layer thereof, and a security signal having been recorded on the second layer over the data signal recorded on the first layer, said method comprising the steps of:

erasing the security signal that has been recorded on the second layer of the magnetic recording medium; and subsequently reproducing the data signal that has been recorded on the first layer of the magnetic recording medium.

19. A magnetic recording method using a magnetic recording medium having recording layers which include an upper layer formed of a magnetic substance having a first coercive force and a second layer formed of a magnetic substance having a second coercive force, the first layer being provided on the support base, the second layer being formed on the first layer, and the first coercive force being higher than the second coercive force, said method comprising the steps of:

magnetically recording an ID signal, which represents ID information, on the magnetic recording medium down to the first layer thereof;

magnetically recording a data signal, which represents information to be recorded, on the magnetic recording medium down to the first layer thereof; and magnetically recording a security signal, on the second layer of the magnetic recording medium, over at least the data signal that has been recorded on the first layer of the magnetic recording medium.

20. The method according to claim 19, wherein the step of magnetically recording a security signal includes recording a random signal.

21. The method according to claim 19, wherein the first layer is directly provided on the support base.

22. The method according to claim 19, wherein the second layer is directly formed on the first layer.

23. The method of claim 19, wherein the step of magnetically recording the security signal includes applying a current having $1/20$ to $1/2$ a value of the current applied during the step of magnetically recording the data signal.

24. A magnetic reproducing method for reproducing a data signal from a magnetic recording medium having a support base recording layers in which a first layer is formed of a magnetic substance having a first coercive force and a second layer is formed of a magnetic substance having a coercive force, the first layer being provided on the support base, the second layer being formed on the first layer, and the first coercive force being higher than the second coercive force, the data signal, which represents information to be recorded, having been recorded on the magnetic recording medium down to the first layer thereof, and a security signal having been recorded on the second layer over the data signal recorded on the first layer, said method comprising the steps of:

reproducing the ID signal from the magnetic recording medium;

comparing the ID information represented by the reproduced ID signal and entered ID information;

erasing the security signal, which has been recorded on the second layer over the data signal recorded on the first layer of the magnetic recording medium, when the two items of ID information agree; and subsequently reproducing the data signal that has been recorded on the first layer of the magnetic recording medium.

\* \* \* \* \*